United States Patent [19]

Kashubara

[11] Patent Number: 4,534,115
[45] Date of Patent: Aug. 13, 1985

[54] VEHICLE WHEEL LOCATION DEVICE

[76] Inventor: Dan Kashubara, 8803 N. Palmyra Rd., Canfield, Ohio 44406

[21] Appl. No.: 454,845

[22] Filed: Dec. 30, 1982

[51] Int. Cl.³ .................... G01B 5/255; G01B 11/275
[52] U.S. Cl. .................................. 33/203.18; 33/286; 33/288; 33/193
[58] Field of Search ............... 33/203, 203.18, 286, 33/288, 193, 293–297, 298, 299

[56] References Cited

U.S. PATENT DOCUMENTS

| | | | |
|---|---|---|---|
| 3,685,161 | 8/1972 | MacPherson | 33/203.18 |
| 3,709,451 | 1/1973 | Graham | 33/203.18 |
| 3,822,478 | 7/1974 | Aly et al. | 33/203 X |
| 4,285,136 | 8/1981 | Ragan | 33/203.18 |

Primary Examiner—Harry N. Haroian
Attorney, Agent, or Firm—Harpman & Harpman

[57] ABSTRACT

A device for locating a wheel and tire rim assembly on a right angular plane to the axis of a vehicle's axle by aligning the optical projection from a light source supported on the wheel or tire rim assembly to a remote target with a movable indicator positioned thereon.

5 Claims, 5 Drawing Figures

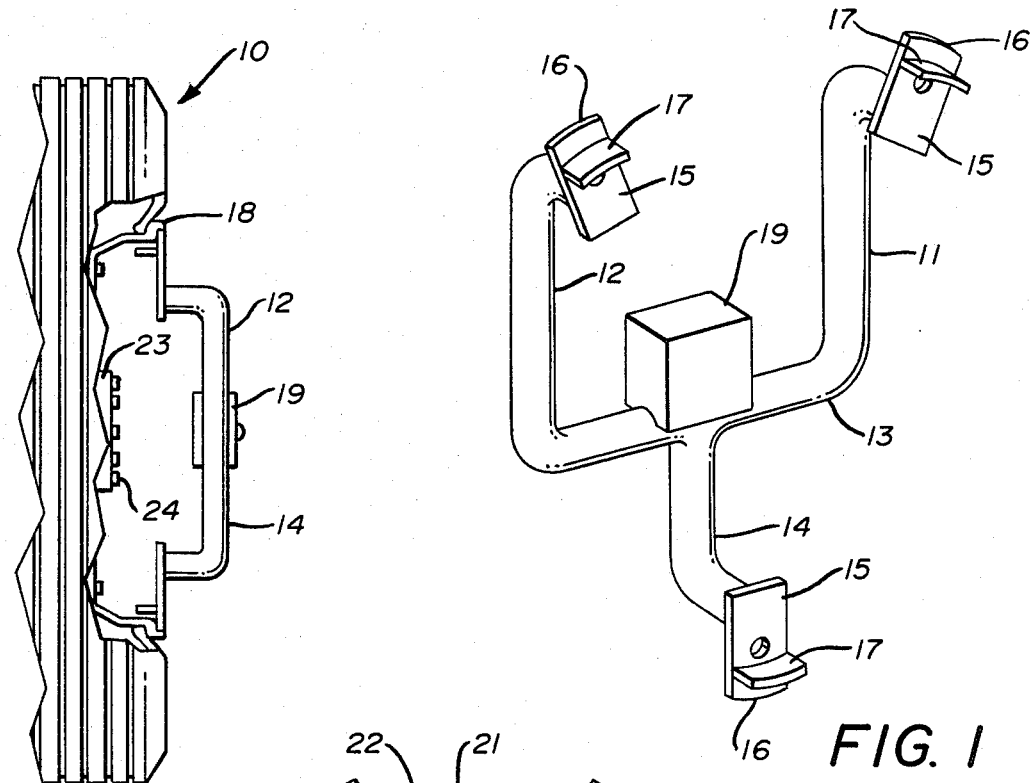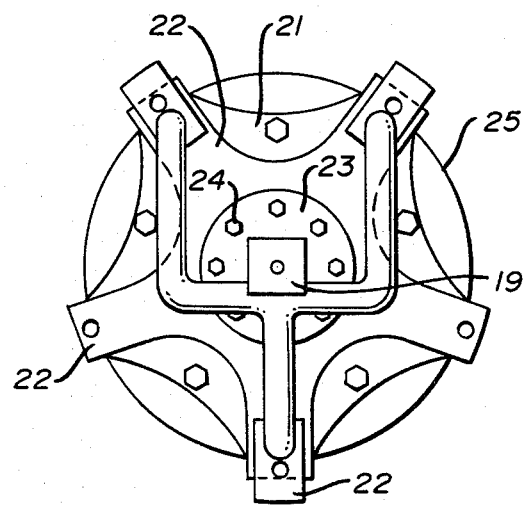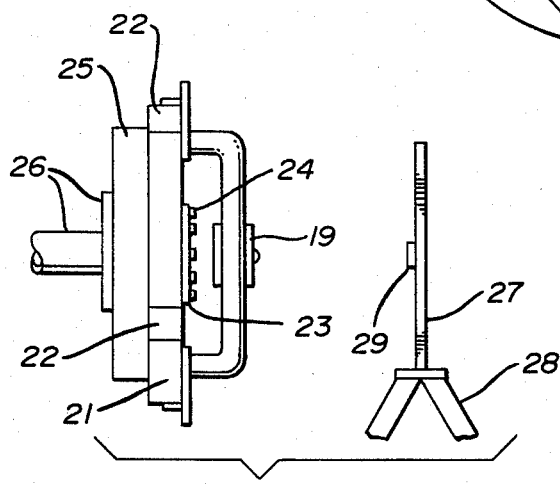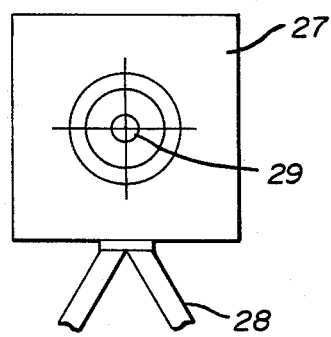

VEHICLE WHEEL LOCATION DEVICE

BACKGROUND OF THE INVENTION (1) Field of the Invention:

This invention relates to the mounting of the vehicle wheels and tire rim assemblies of the type normally found on trucks where the tire and rim assembly must be axially aligned with the wheel.

(2) Description of the Prior Art:

Prior art devices of this type have utilized a number of different designs to align tire rim assemblies to the vehicle's wheel. See for example U.S. Pat. Nos. 3,055,264, 3,337,961, 3,822,478 and 4,011,659.

In U.S. Pat. No. 3,055,264 a wheel alignment apparatus is shown wherein a light projector is suspended outwardly from a vehicle's mounted wheel and aligns the wheel in a traditional manner.

U.S. Pat. No. 3,337,961 on a wheel checking instrument having rotatable reference projectors movably positioned on the rim portion of the tire to check the wheel alignment in the usual manner.

U.S. Pat. No. 3,822,478 discloses a wheel centering device that aligns one wheel rim with respect to a second wheel as found on dual wheel arrangements on trucks.

Finally in U.S. Pat. No. 4,011,659, a centering apparatus is disclosed that attaches to the wheel of the vehicle and determines if the axle is incorrectly adjusted or aligned.

Applicant's device determines location of the wheel and the tire rim assembly on the right angular plane to the axis of the vehicle's axle by positioning a light source on that axis and projecting a light beam to an alignment indicator on a target spaced from the light source.

SUMMARY OF THE INVENTION

A locating device for a wheel and tire rim assembly comprising a mounting member capable of being secured to either the wheel or the rim of a vehicle. A light source centrally mounted on the mounting member projects a light beam on a target indicating the center of the right angular plane to the axis of the vehicle's axle so proper alignment of the wheel and the tire rim assembly can take place.

The target has a movable magnetic indicator which can be positioned to indicate the point at which the light beam strikes the target. Alignment of the vehicle's wheel and tire rim assembly is achieved by matching the relative position of the light beam as it strikes the target when the location device is mounted on either the rim of the tire rim assembly or on the wheel itself.

DESCRIPTION OF THE DRAWINGS

FIG. 1 is a perspective view of the locator device;

FIG. 2 is a front plan view of the device on a vehicle's wheel;

FIG. 3 is a side elevation of the device on a wheel with parts broken away and an alignment target;

FIG. 4 is a front plan view of a portion of the target; and

FIG. 5 is a side elevation of the device mounted on a rim of a tire, wheel and axle assembly with parts broken away.

DESCRIPTION OF THE PREFERRED EMBODIMENT

A locating device for tire and rim assemblies 10 as used on vehicle, such as trucks, will be seen in FIGS. 1, 2 and 5 of the drawings comprising a pair of spaced parallel tubular body members 11 and 12 with a transversely extending tubular member 13 extending therebetween adjacent their lower ends. A secondary tubular body member 14 extends from said transversely extending tubular member 13 midway of its length. Each of the free ends of said tubular body members 11, 12 and 14 extend outwardly at right angles defining a triangular pattern therebetween.

A rectangular mounting plate 15 is secured to each of the free ends of the tubular members 11, 12 and 14. Each of the mounting plates 15 has a curved edge 16 and a sidewardly extending curved bracket 17 adjacent its curved edge 16. The curved edge 16 is beveled to better engage a tire rim 18 as will be described hereinafter in greater detail.

The mounting plates 15 on the tubular members 11 and 12 are in offset angularly disposed relation to the vertical axis of the tubular members 11 and 12 so that they will fit on the wheel and tire assembly 10 as seen in FIG. 5 of the drawings.

Each of the mounting plates 15 is apertured just above the point of contact with the free ends of the tubular members and just below the sidewardly projecting curved bracket 17. The mounting plate 15 on the secondary tubular member 14 is aligned in spaced parallel relation to the secondary tubular member 14.

A light generating source 19 is secured to the transversely extending tubular member 13 at its junction with the secondary tubular member 14. The light source 19 is thus positioned to be centrally located between the mounting plates 15.

Referring now to FIGS. 2, 3 and 4 of the drawings, the location device can be seen in use on a wheel disc 21 formed to provide a plurality of circumferentially spaced radial arm portions 22 with a cover plate 23 secured thereto by a plurality of machine screws 24. The wheel disc 21 is mounted to a brake drum 25 or other portion of an axle and housing assembly 26. The location device is supported on the ends of the arm portions 22 by the upstanding curved members 17 which in turn center the light source 19 in relation to the axle and housing assembly 26.

Referring to FIGS. 3 and 4 of the drawings, the locating device generates through its light source 19 a visual indication on a target 27 supported on a stand 28. The light source 19 generates a light beam projecting outwardly and centrally in relation to the mounting plates 15. The light beam forms indicia thereon and a magnetic indicator 29 is positioned on the target 27 indicating the center position of the indicia on the target 27.

Referring now to FIG. 5 of the drawings, the locating device is engaged on the wheel and tire assembly 10 which is shown with parts broken away. The locating device is engaged and held in place against the tire rim 18 by the curved end edge 16 of the mounting plates 15 for the proper positioning of the rim and tire assembly 10 onto the wheel disc 21.

In use, the locator device may first be suspended from the ends of the spaced radial arm portions 22 of the straight wheel disc 21 as hereinbefore described indicating the proper wheel alignment in relation to the axis of a vehicle's axle as indicated on the target 26 by the light beam and magnetic indicator 29. The locator device is then removed and the rim and tire assembly 10 is mounted to the wheel disc 21. The locator device is then secured to the tire rim 18 as seen in FIG. 5 of the drawings and the light source 19 indicates the relative position of the rim and tire assembly 10 on the target 27 so adjustments can be made to the rim and tire assembly 10 bringing it into proper alignment as indicated by the light beam from the light source 19 striking the position marked with the magnetic indicator 29 on the target 28.

The rim and tire assembly 10 is then tightened in place providing proper alignment in relation to the axis of the vehicle's axle.

The locator device thus determines the proper alignment of the vehicle's wheels and tires by providing a reference guide that can easily be matched by a visual observation.

It will be apparent to those skilled in the art that various changes and modifications may be made herein without departing from the spirit of the invention.

Having thus described my invention, what I claim is:

1. A device for locating tire and rim assemblies on vehicle wheels on a right angular plane to the axis of a vehicle's axle comprising a vertically disposed mounting structure having at least three outwardly extending body members, vertically disposed mounting plates secured to the free ends of said body members, the outermost ends of said mounting plates being curved and beveled, arcuate brackets on said mounting plates inwardly of the outermost ends thereof for engagement over said wheel, a light beam generating source secured centrally of said mounting structure arranged to project said light beam axially of said wheel, target means for indicating the position of said light beam thereon so that proper alignment of the tire and rim assembly relative to the axle can be made, said target means imcluding a vertical target and movable indicator on said target.

2. The locating device of claim 1 wherein said mounting plates on said body members are positioned in offset relation to said body members.

3. The locating device of claim 1 wherein said vertical target and indicator are formed of magnetically attracted material.

4. The locating device of claim 1 wherein said target and indicator are formed of self-adhering material.

5. The locating device of claim 1 wherein said brackets are circumferentially speced with respect to one another and conform with a radius defining said tire and rim assemblies.

* * * * *